(No Model.)
F. H. HALL.
Apparatus for Skimming Milk.
No. 234,670. Patented Nov. 23, 1880.
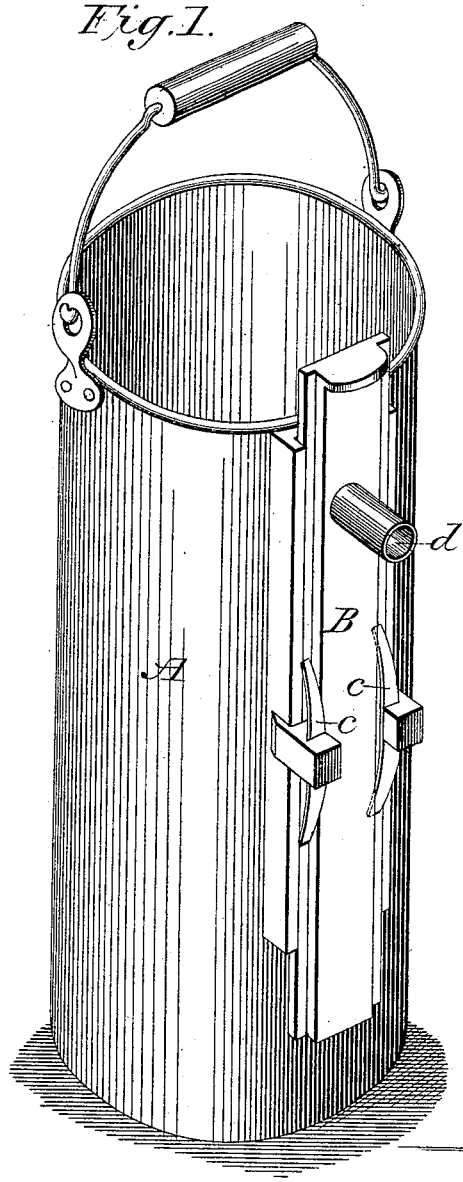
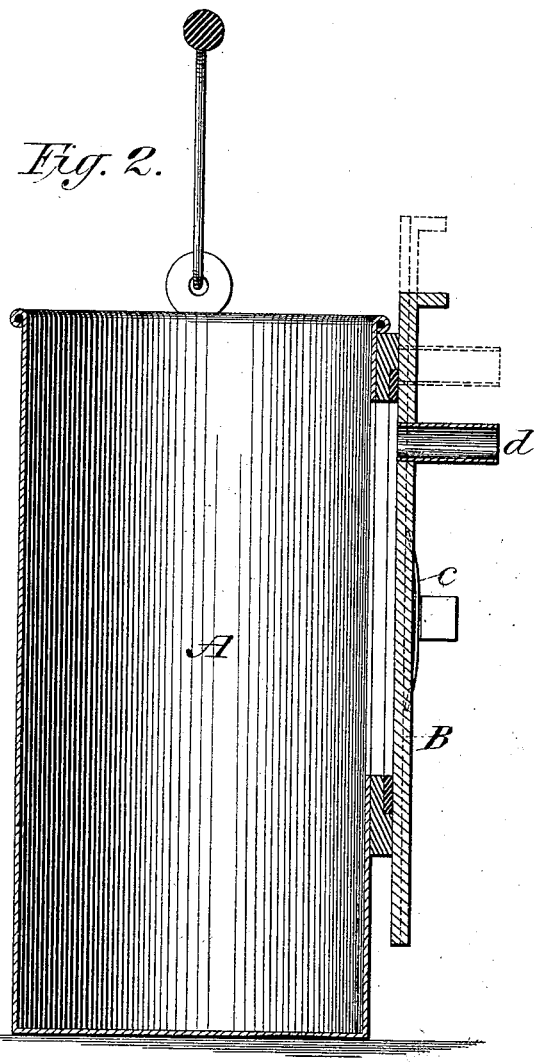
Witnesses:
J. C. Judd
Jerome Phillips
J. H. Bliss
Inventor:
Frank H. Hall.

UNITED STATES PATENT OFFICE.

FRANK H. HALL, OF SUGAR GROVE, ASSIGNOR OF ONE-HALF TO R. W. GROVER, OF CHICAGO, ILLINOIS.

APPARATUS FOR SKIMMING MILK.

SPECIFICATION forming part of Letters Patent No. 234,670, dated November 23, 1880.

Application filed March 23, 1880. (No model.)

*To all whom it may concern:*

Be it known that I, FRANK H. HALL, of Sugar Grove, in the county of Kane and State of Illinois, have invented a new and useful Improvement in Apparatus for Skimming Milk; and I do hereby declare that the following is a full, clear, and exact description thereof, which will enable others skilled in the art to which it appertains to make and use the same, reference being had to accompanying drawings, and to letters of reference marked thereon, which form a part of this specification.

My invention consists of a slider provided with a tube or spout, vertically adjustable in guides fixed to the outside of a milk-vessel, which is kept to a close joint by means of springs secured in lugs projecting from said vessel's side, whereby the cream rising from the milk may be drawn at any height, as will be hereinafter fully set forth.

When milk, set while warm, is rapidly cooled to about 50° Fahrenheit, the cream will all be raised in from five to ten hours. At this period the particles of cream have but little cohesion, which renders it impossible perfectly to remove the cream by the ordinary method. Any attempt to do this will cause a considerable portion of the cream to again mingle with the milk; hence, heretofore it has been thought necessary to allow the cream to remain upon the milk from twenty-four to thirty-six hours, until, by evaporation and condensation, its consistency is increased and the difficulty of removing it correspondingly diminished.

My invention is an apparatus for removing the cream by allowing it to escape through the side of the can by the force of gravity. It consists of a milk can or pan, which may be cylindrical in shape and of any desired depth, in combination with a movable exit-pipe, through which the cream may be drawn at variable altitudes.

A is the can in which the milk is placed. B is a slider, which is vertically adjustable, and covers an oblong opening in the can. This slider, with its packing of leather or other suitable substance, is held in place by the springs $cc$. Near the upper end of the slider is the tube $d$. The length of the slider and of the oblong opening in the can and the position of the tube $d$ are such that when the slider is raised the tube $d$ will be above the opening in the can, and consequently closed. Upon depressing the slider the tube $d$ is brought opposite the oblong opening in the can, and cream may be drawn at variable altitudes.

The slider may be made relatively somewhat shorter, and the cream allowed to pass over a lip on its upper end.

I am aware of English Patent No. 1,259 of 1857, which consists of a vessel with holes in its sides and a gate curved inward, vertically adjustable in inner vertical grooves, said gate being intended to receive the overflow of whey from the curd, which passes down through said tube or gate and out of said holes in the vessel's side, and to such I make no claim.

What I claim is—

In a device for skimming milk, the combination of the slide B, provided with tube $d$, the vessel A, having a vertical elongated slot provided with vertical guides, and springs $c$, fixed in lugs extending from said vertical guides, provided to bear against said slide B and form a close joint between said vessel and slide B, all arranged substantially as and for the purpose specified.

FRANK H. HALL.

Witnesses:
C. L. BENJAMIN,
N. H. NORRIS.